US006988103B2

(12) United States Patent
Chithambaram et al.

(10) Patent No.: US 6,988,103 B2
(45) Date of Patent: Jan. 17, 2006

(54) LOCATION BASED SERVICES BRIDGE TO EXTERNAL DATA SOURCES

(75) Inventors: Nemmara Chithambaram, Novato, CA (US); Scott Ding, Novato, CA (US)

(73) Assignee: Autodesk, Inc., San Rafael, CA (US)

(*) Notice: Subject to any disclaimer, the term of this patent is extended or adjusted under 35 U.S.C. 154(b) by 511 days.

(21) Appl. No.: 10/034,440

(22) Filed: Dec. 26, 2001

(65) Prior Publication Data

US 2003/0120637 A1 Jun. 26, 2003

(51) Int. Cl.
G06F 17/30 (2006.01)

(52) U.S. Cl. ............................................. 707/10; 707/9
(58) Field of Classification Search ............... 707/1–10, 707/102–104.1; 455/456.3
See application file for complete search history.

(56) References Cited

U.S. PATENT DOCUMENTS

| | | | |
|---|---|---|---|
| 5,790,800 A | 8/1998 | Gauvin et al. | |
| 5,966,135 A | 10/1999 | Roy et al. | |
| 5,974,431 A | 10/1999 | Iida | |
| 5,978,672 A | 11/1999 | Hartmaier et al. | |
| 6,057,854 A | 5/2000 | Davis, Jr. et al. | |
| 6,081,624 A | 6/2000 | Krishnaswamy | |
| 6,115,754 A | 9/2000 | Landgren | |
| 6,236,365 B1 | 5/2001 | LeBlanc et al. | |
| 6,243,709 B1 | 6/2001 | Tung | |
| 6,295,502 B1 | 9/2001 | Hancock et al. | |
| 6,337,693 B1 | 1/2002 | Roy et al. | |
| 6,466,796 B1 * | 10/2002 | Jacobson et al. | 455/456.3 |
| 6,650,902 B1 * | 11/2003 | Richton | 455/456.3 |
| 2002/0176579 A1 * | 11/2002 | Deshpande et al. | |
| 2003/0008619 A1 * | 1/2003 | Werner | |
| 2003/0105826 A1 * | 6/2003 | Mayraz | |

OTHER PUBLICATIONS

Autodesk, Inc. Press Release, "Autodesk and Fiat Deliver New Wireless Data Services Solution to Operator Telecom Italia Mobile," Dec. 2001, 3 pp.
Autodesk, Inc. Press Release, "Autodesk Location Services Announces Availability of Autodesk MobileConnect for Wireless Operators," Dec. 2001, 3 pp.
Autodesk, Inc. Press Release, "Ericsson and Autodesk Location Services to Offer Wireless Operators Location–Enabled SMS Services," Dec. 2001, 2 pp.
XERO95, "Map Viewer Technical Details," Xerox Corporation, Jun. 1995, 3pp.
SOFT95, Specification for the Simple Vector Format (SVF) v1.1, article, SoftSource, Bellingham, WA, 1997, pp 1–8.

* cited by examiner

Primary Examiner—Gloria Robinson
Assistant Examiner—Debbie M. Le
(74) Attorney, Agent, or Firm—Gates & Cooper LLP

(57) ABSTRACT

Embodiments of the invention provide access to a user's profile information to a location based service, location enable user profile information in external databases, portals, etc., and allow the seamless/transparent provision of location services using both internal and external profile information. A compact definition of a schema of an external database (that comprises a user's profile information) is stored. Data source information that describes how to connect and communicate with the external database and a structured query language (SQL) statement is stored, wherein the statement, upon execution, extracts properties from the external database corresponding to the compact definition. A foreign key identifies a record in the external database and positional information for the record in the external database is stored as a geocoding index. The stored information is then used to provide access to the user's profile information.

40 Claims, 6 Drawing Sheets

$\theta_1$ Starting angle
$\theta_2$ Ending angle
$d_1$ Inner radius
$d_2$ Outer radius

LOCATION BASED SERVICES BRIDGE TO EXTERNAL DATA SOURCES

CROSS-REFERENCE TO RELATED APPLICATIONS

This application is related to the following co-pending and commonly-assigned patent applications, which applications are incorporated by reference herein:

U.S. patent application Ser. No. 10/037,805, entitled "MOBILE DEVICE LOCATOR ADAPTER SYSTEM FOR LOCATION BASED SERVICES", by Nemmara Chithambaram, et. al., filed on Dec. 26, 2001;

U.S. patent application Ser. No. 10/034,442, entitled "FUZZY LOGIC REASONING FOR INFERRING USER LOCATION PREFERENCES", by Nemmara Chithambaram, filed on Dec. 26, 2001;

U.S. patent application Ser. No. 09/629,115, entitled "METHOD AND APPARATUS FOR PROVIDING ACCESS TO MAPS ON A PERSONAL DIGITAL ASSISTANT (PDA)", No. 30566.96USU1, filed on Jul. 31, 2000 now abandoned;

U.S. patent application Ser. No. 09/628,851, entitled "GEOGRAPHICAL DATA MARKUP ON A PERSONAL DIGITAL ASSISTANT (PDA)", by Edward J. Connor, et al., filed on Jul. 31, 2000;

U.S. patent application Ser. No. 09/628,850, entitled "GENERALIZED, DIFFERENTIALLY ENCODED, INDEXED RASTER VECTOR DATA AND SCHEMA FOR MAPS ON A PERSONAL DIGITAL ASSISTANT", filed on Jul. 31, 2000, now U.S. Pat. No. 6,674,445;

U.S. application Ser. No. 09/795,719, entitled "INTER-PROCESS APPLICATION PROGRAMMING INTERFACE FOR PERSONAL DIGITAL ASSISTANT APPLICATIONS," filed on Feb. 28, 2001, by Timothy John Nelson, et. al., U.S. application Ser. No. 09/795,890, entitled "SINGLE GESTURE MAP NAVIGATION GRAPHICAL USER INTERFACE FOR A PERSONAL DIGITAL ASSISTANT," filed on Sep. 5, 2001, by Nemmara Chithambaram, et. al., U.S. patent application Ser. No. 09/629,117, entitled "METHOD AND APPARATUS FOR OBTAINING A SET OF MAPS", by Howard Marantz et al., filed on Jul. 31, 2000; and Patent Cooperation Treaty application serial number PCT/U.S.00/26436, entitled "GEOGRAPHIC MAPS ON A PERSONAL DIGITAL ASSISTANT (PDA) AND SERVER," filed on Sep. 26, 2000, by Nemmara Chithambaram, et. al., U.S. patent application Ser. No. 09/411,506, entitled "VECTOR-BASED GEOGRAPHIC DATA", by Gregory A. Roy, et. al., filed on Oct. 4, 1999, now U.S. Pat. No. 6,337,693, which is a continuation patent application of U.S. Pat. No. 5,966,135 issued on Oct. 12, 1999 (application Ser. No. 08/757,706 filed on Oct. 30, 1996), by Gregory A. Roy et al., entitled "VECTOR-BASED GEOGRAPHIC DATA".

BACKGROUND OF THE INVENTION

1. Field of the Invention

The present invention relates generally to location based services, and in particular, to a method, apparatus, and article of manufacture for detecting the location of a mobile device.

2. Description of the Related Art

Location based services (LBS) are applications/services that utilize or are based on the location of a mobile device (e.g., a cellular phone, a personal digital assistant, etc.). It is desirable to customize LBS applications for individual users based on information known about the users. However, such information is often not locally available and is difficult or impossible to access. Accordingly, what is needed is the ability to access and utilize a user's personal information. These problems may be better understood by describing location based services and the use of personal information.

Detecting the location of a mobile device is fundamental to providing location based services. For example, detecting that a device is located on a particular street (e.g., McInnis Parkway) allows an LBS application to provide a nearby theatre (e.g., Northgate Mall Cinema) when a user requests the closest entertainment option. Additional examples of LBS applications include traffic updates, location sensitive billing, fleet management, and asset and people tracking.

LBS applications may be customized for individual users using personal information about the user (i.e., the user's profile information). For example, the user's profile information may include the user's name, home/office address, and even preferences related to choice of cuisine, travel preferences, etc. By transmitting this information to a wireless device (e.g., cellular phone), an LBS application may be highly customized to suit a user's preferences. This personalized data is currently available from telephone operators, wireless carrier databases, etc. and is often reloaded into an LBS database. For example, to utilize profile information maintained by a mobile phone carrier, the entire database may be transferred and stored locally.

Such reloading of personalized information results in increased cost (i.e., time, effort, and dollars), and synchronization problems (i.e. over a period of time, a difference may develop between the source and the data duplicated in the LBS database). Further, the data may come in different formats, different schemas, from databases from different vendors, from files from different operating systems, and custom data is not LBS-aware (i.e., does not have a location element). Additionally, the mobile phone carrier may not allow the transfer of the database.

SUMMARY OF THE INVENTION

Location based services may be customizable for particular users based on profile/personal information of a user. To customize location based services in the prior art, databases maintained by carriers were often copied locally and frequently reloaded to ensure that the data remained accurate. In one or more embodiments of the invention, a foreign/external database may be accessed by an application while the full records remain in the database and are not copied locally.

Embodiments design and implement a compact LBS bridge to external profile databases. The LBS bridge comprises a compact definition of the schema of the external database (including the name of the attributes, the types, and the constraints). The LBS bridge also comprises data source information (e.g., how to connect and communicate with the external database) and an SQL statement that will extract the properties from the data source corresponding to the schema definition. Records in the external data source are identified by storing the foreign keys for each record in a table within an LBS database. In addition, positional information from the external record is extracted/obtained and stored in the table as a geocoding index (thus making the external database LBS enabled). The collection of the services are then made available in the form of an external application programming interface for system integrators.

As a result of the LBS bridge, location based services can extend to the large amount of profile information accumulated by wireless carriers, phone companies, etc. which in turn makes their services more personalized and valuable to the end user. Thus, embodiments of the invention location enable user profile information in external databases, portals, etc. and allow the seamless provision of location services using both internal and external profile information.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and in which is shown, by way of illustration, several embodiments of the present invention. It is understood that other embodiments may be utilized and structural changes may be made without departing from the scope of the present invention.

Overview

Using an application programming interface (API), an LBS bridge is created that contains the definition of a schema of an external database, data source information that describes how to connect and communicate with the external database, and a database query statement that upon execution extracts properties from the external database corresponding to the schema definition. Positional information and a foreign key for each record in the external database are stored in a table and used to determine which records are within a desired locale and need to be retrieved to provide a customized location based service. Once identified, the key in the table is used with the database query statement and the information set forth in the schema definition to retrieve desired information from the external database. Accordingly, the LBS bridge provides a method, apparatus, and article of manufacture for accessing a user's personal information through an application programming interface.

Hardware Environment

Figure 1:
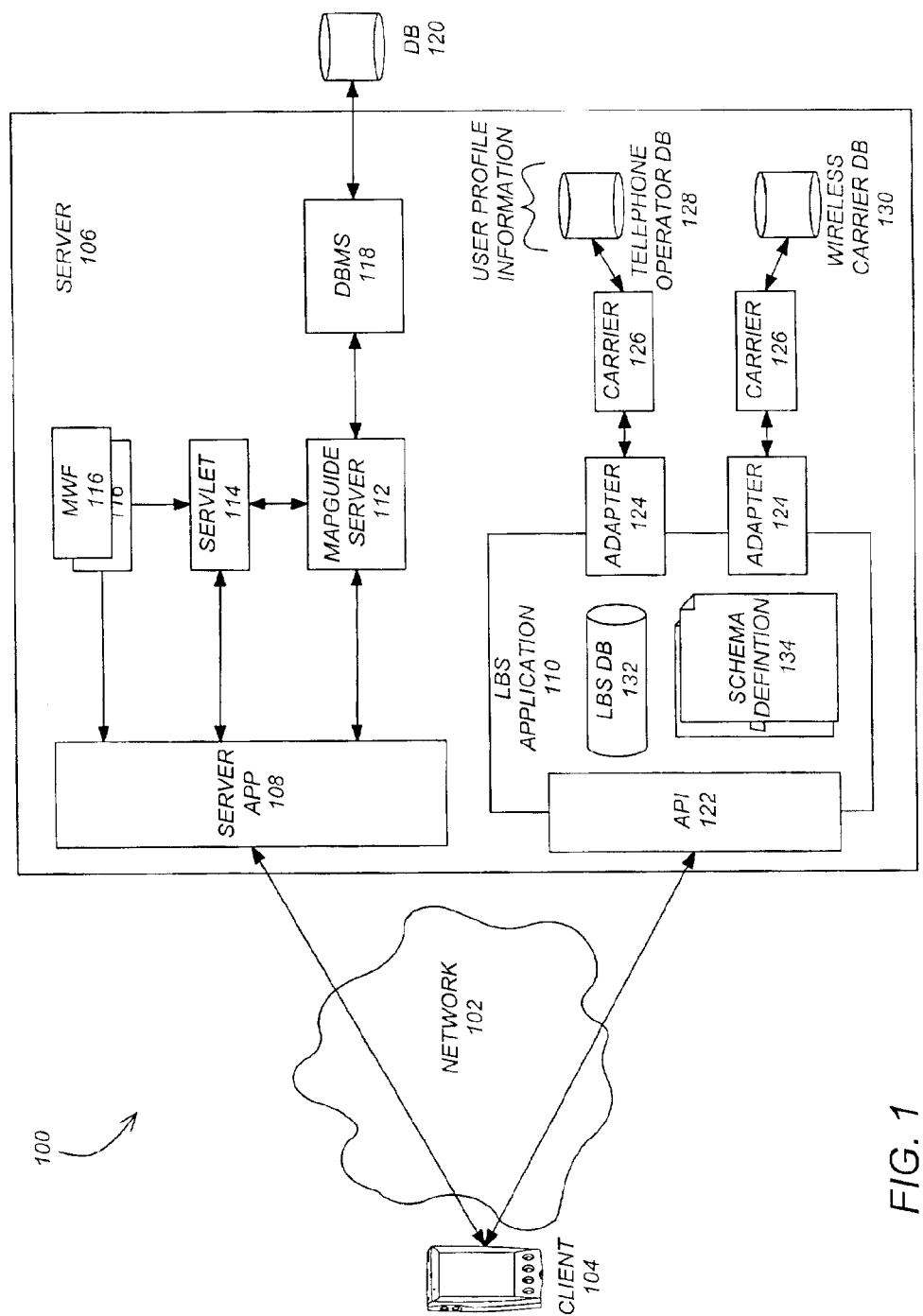
FIG. 1 schematically illustrates a hardware and software environment utilized in accordance with one or more embodiments of the invention.

FIG. 1 schematically illustrates a hardware and software environment utilized in accordance with one or more embodiments of the invention. A typical distributed computer system 100 uses a network 102 (such as the Internet) to connect technicians utilizing mobile device clients 104 (e.g. a cellular phone, PDA, WINCE, or PALM device) or desktop clients (e.g., a computer system rung a browser) to server computers 106.

A mobile device client 104 may include any type of mobile device such as handheld personal computers (HPC), palm-held personal computers (PPC or PDA), cellular phones, smart phones, etc. However, embodiments of the invention may be implemented on desktop clients as well. Hereafter, mobile device clients 104 and desktop clients may be used interchangeably and refer to all types of clients/client computer systems. A typical combination of resources used in system 100 may include a network 102 such as a cell phone network, the Internet, LANs, WANs, or the like, mobile devices 104, desktop clients, and servers 106 that are personal computers, workstations, minicomputers, or mainframes.

The network 102 connects mobile device clients 104 or desktop clients executing the appropriate software applications to server computers 106. Server computers 106 may execute a variety of applications including a server application 108 (e.g., a Web server), an LBS application 110, MapGuide server 112, and/or servlet 114. MapGuide servers 112 and servlets 114 may be located within or part of server application 108. The server 106 and its components may also be referred to as a back office system. Such a back office system maintains access to corporate databases, synchronization utilities, etc. The server application 108 is typically a program such as a UNIX Apache Web server or Microsoft's Internet Information Server. The servlet 114 may communicate with a client 104 through server application 108 such that any additional processing required by a client 104 may be performed by the servlet 114.

In a geographic information system (GIS) offering location based services, servlet 114 may communicate with MapGuide server 112 to obtain needed map data/information. Additionally, servlet 114 may access map windows files (MWF) 116 to obtain relevant data. MapGuide server 112 (or another application) may also interact with a database management system DBMS) 118 that may be utilized to retrieve relevant geographical data (such as SDF [Spatial Data Files] data [a special data format for delivering large amounts of data quickly over an intranet or the Internet], raster data, Open DataBase Connectivity (ODBC) data, etc.) from database 120.

Further, client 104 may interface with LBS application 110 through an application programming interface (API) 122 that provides a uniform interface for determining a location of device 104 and providing additional location based services. To determine the location of client device 104, the LBS application may utilize one or more adapters 124 for each of the different protocols of various mobile device carriers 126. The carriers 126 may also maintain user profile information in one or mote databases 128–130. As described above, the LBS application 110 may also maintain an LBS database 132. In the prior art (as described above) the user profile information is often reloaded into the LBS database 132.

The LBS application 110 may implement a compact LBS bridge to the external databases 128–130. To implement the LBS bridge, the LBS application 110 maintains a compact definition 134 of the schema of each external database 128–130. The schema is described in detail below.

Generally, components 104–134 all comprise logic and/or data that is embodied in or retrievable from a device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Mobile Device Locator Adapter System

A device locator application may be executing on a client 104 or a server 106 to determine the location of a specific mobile device client 104. Details regarding this application are disclosed in the co-pending and commonly assigned U.S. patent application Ser. No. 10/037,805, entitled "MOBILE DEVICE LOCATOR ADAPTER SYSTEM FOR LOCATION BASED SERVICES", by Nemmara Chithambaram, et. al., filed on Dec. 26, 2001, which application is incorporated by reference herein.

To determine the location of a mobile device client 104, a device-specific identification is provided to the device locator. For example, a mobile subscriber international subscriber directory number (MSISDN) (the directory number [e.g., the GSM—global system for mobile communications number] or the number one dials to connect to a GSM subscriber) may be provided to a device locator application 110. Such an MSISDN may be encoded in a cookie in a wireless application request. Alternatively, a device may be identified by an Internet protocol (IP) address encoded in a request header or may be identified by a pre-stored default in the user profile database 128–130.

The resulting location provided by the device locator 110 contains the coordinates of the device 104, the device's 104 spatial reference system (SRS), and information regarding the precision of the coordinates.

The device locator 110 provides an interface 122 for accessing the network-provided location of a device 104. For devices 104 that provide their own location (such as via a SIM card), the application developer already has the coordinates of the device 104 and does not need to use the device locator 110.

The device locator 110 provides users with a unified API 122 for determining the location of devices 104. The device locator 110 retrieves the location of devices 104 from third-party location determination technology (LDT) providers 126, each of which may support different protocols (e.g., HTTP, HTTPS, etc.). LDT is a general term that describes a carrier network based service that provides device 104 location information to internal and external systems. LDT adapters 124 may be supplied by specific carriers 126 and may be utilized to provide the location information. Any location obtained from a source other than the supplied LDT adapters 124 may still be used throughout GIS applications in any application programming information (API) call that requires a location parameter. As described above, LDT providers/carriers 126 may each support different protocols that may vary with respect to the format of the request, the format of the response, and the accuracy of the response. Some services may only provide a geographic region that the mobile system is within, while others may provide specific coordinates.

The device locator interface (i.e., the API) 122 insulates application code from the specific APIs of individual LDT providers 126. Application developers do not need to understand provider APIs or protocols. Instead, an LDT adapter 124 translates specific provider APIs into a generic API 122 that is presented to the application as the device locator 110. The LDT adapter 124 therefore insulates the application from differences in protocols like hypertext transfer protocol (HTTP), secure hypertext transfer protocol (HTTPS), etc. Such an architecture may also support additional LDT providers 126 in the future without changing the application API 122. An LDT adapter 124 simply needs to be written for the new LDT provider 126.

Figure 2:
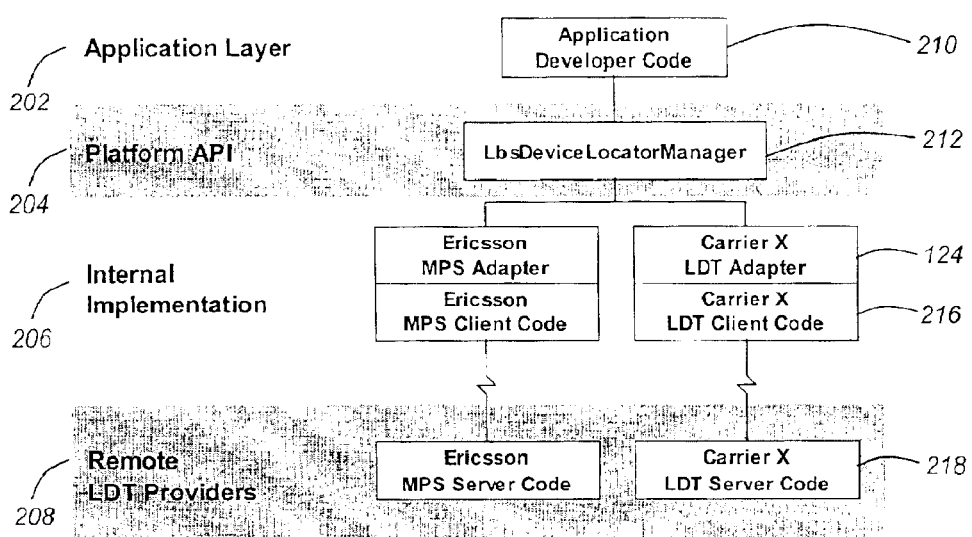
FIG. 2 illustrates a simple representation of an architecture that supports a device locator in accordance with one or more embodiments of the invention.
Figure 3:
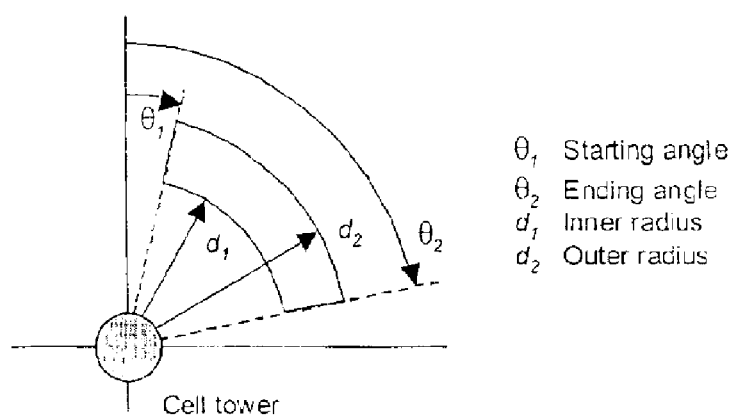
FIG. 3 illustrates the modeling of location data as an arc in accordance with one or more embodiments of the invention.

FIG. 2 illustrates a simple representation of an architecture that supports a device locator 110 in accordance with one or more embodiments of the invention. As illustrated, the architecture has several layers 202–208. Application code 210 in application layer 202 interfaces through the uniform API 122 with a device locator 212 (e.g., LbsDeviceLocatorManager) in the platform API layer 204 to obtain location information for a device 104.

The device locator 212 interfaces with individual carrier protocols set forth in specific carrier LDT adapters 124 in internal layer 206 to retrieve location information using carrier specific implementations. The carrier LDT adapters 124 interact with client code 216 that communicates with server code 218 in the remote LDT provider layer 208.

To query the location of a device 104, the application code 210 retrieves an instance of a device locator object 212 (e.g., LbsDeviceLocatorManager). The application code 210 may then use the device locator 212 to obtain the location of a device 104 given a device's id. As described above, the format of device ids may vary according to the LDT implementation. If a query for the location of a device 104 fails, the device locator 212 may generate an exception.

If the query is successful, a location object may be returned to application layer 202. As described above, the resulting location object may contain a Point/Coordinate object containing the coordinates representing the device's location, an SRS object that describes the associated spatial reference system, and a Precision object that describes the precision of the coordinates.

In one or more embodiments of the invention, a device locator manager provides the API 122 and delegates calls to specific getLocation methods implemented for/by individual carriers 126. To ensure that the individual carriers 126 implement such a getLocation method, an interface (e.g., a devicelocator interface) may be implemented by all specific device locator adapters 124.

Location Refinement

Once a location for a device 104 has been obtained, one or more embodiments of the invention may refine the approximate location by applying several heuristics. A user or application may specify when such a location refinement is to occur. For example, a boolean "REFINE" value may be set to TRUE if refinement is desired. Accordingly, once a location is identified (as described above), the boolean value may be examined to determine if further refinement should be performed.

A user may be permitted to specify the desired methodology for refining the location of a device 104. The different methodologies may include snapping the location to the closest point on the street network, a landmark, or a "point of interest" in the vicinity. Alternatively, the application may look for locations in the vicinity of the approximate location that the mobile device 104 user has recently visited (i.e., studying the "history" in the user profile) and snapping the location to a particular location (e.g., the closest location last visited). Further, the application may examine "favorite" locations bookmarked by the mobile device user and determine if any such "favorite" locations ate in the vicinity of the approximate device 104 location. The approximate location may then snap to the closest "favorite" location.

To refine the approximate location of a device 104, a location refinement manager may be utilized. The location refinement manager is the initial point for location refinement, and a method of the location refinement manager may return a list of lists of refined locations. Each list of refined locations may be based on the particular refinement performed. For example, one list may be based on favorites, a second list may be based on the history, while a third list may be based on landmarks. Further, each list may be sorted based on their distance from the centroid or approximate location.

Once the list of lists of refined locations is obtained, all of the lists may be resolved into a single list. For example, each location in each list may be combined into a single list sorted by distance from the centroid. Additionally, the individual lists or single resolved lists may be filtered such that only locations within a specified polygon ate returned. Further, based on the individual lists or single resolved list, a single refined list may be returned. Accordingly, depending on the implementation of the location refinement manager, the user may be presented with a single refined location, a list of refined locations, or a list of lists of refined locations. Nonetheless, the location refinement manager permits the approximate location of a device 104 to be refined based on various factors/heuristics that may be selectable by a user.

Adapter System Flow

Figure 4:
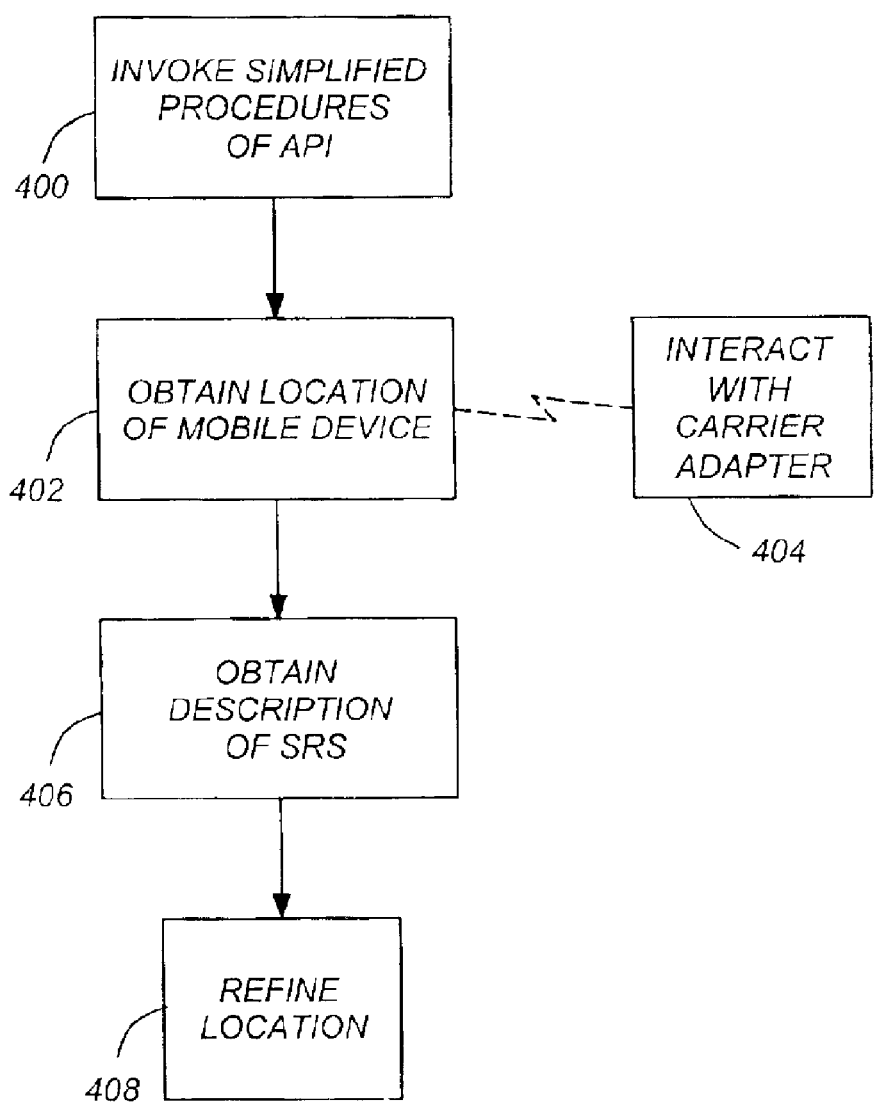
FIG. 4 is a flow chart that illustrates the use of an API in a mobile device locator adapter system in accordance with one or more embodiments of the invention.

FIG. 4 is a flow chart that illustrates the use of an API in a mobile device locator adapter system 100 in accordance with one or more embodiments of the invention. Referring to both FIG. 1 and FIG. 4, in the mobile device locator adapter system 100, an application program 110 (i.e., a device locator) may be dynamically deployed within a computer system 100 without deploying a new version of the computer system 100.

Once the application program 110 has been deployed, simplified procedures of an API 122 of the application program 110 may be invoked at step 400. The simplified procedures obtain the location of the mobile device 104 at step 402 (e.g., using an identification of the mobile device 104). To obtain the location, the invoked procedures interact with the carrier adapter 124 at step 404. Since the carrier adapter 124 is customized for a particular carrier 126, specific information and methods may be utilized. For example, the invoked procedures may interact with the specifics for a mobile positioning server of the carrier 126 and different methods of identifying the device 104 as required by the carrier 126. Additionally, the invoked procedures may obtain the spatial reference system associated with the location of the device 104 at step 406.

The location of the mobile device 104 obtained at step 402 may comprise a cellular phone number, an MSISND, an Internet protocol address encoded in a request header or a pre-stored default. Further as described above, by interacting with one or more carrier adapters 124 at step 404, the invoked procedures interact with different protocols provided by the carriers 126. Once the location has been obtained at step 406, the location may be further refined at step 408. To refine the location, one or more heuristics may be applied. For example, as described above, the location may be snapped to a closest point on a street network, to a landmark or point of interest in the vicinity, to a location in the vicinity of the location the mobile device user has recently visited (by examining the user's "history"), or to a location in a vicinity of the location that the mobile device user has bookmarked as a "favorite" location.

Location Based Services Bridge to External Data Sources

As described above, LBS applications 110 may be highly customized for a particular user based on the user's profile information. User profile information is any data maintained per user in a relational database, portal, etc. Such user profile information may be stored locally (e.g., in an LBS database 132) or externally (e.g., in external data sources 128–130). In the prior art, external profile information is frequently reloaded into an LBS database 132 of an LBS application 110 resulting in increased cost, synchronization problems, data formatting incompatibilities, and problematic non LBS-aware data. For example, a significant amount of a user's profile information may be stored in a carrier's external database 128–130. To utilize such profile information in the prior art, all of the information is copied to an LBS service provider's local database 132. However, a carrier 126 may not permit such a copying for various reasons.

To overcome these problems one or more embodiments of the invention utilize a compact LBS bridge to external profile databases 128–130. The LBS bridge allows the data to remain in the external database 128–130 while still providing the same location based services and utilizing the data. Further, whether the data is local/internal or external remains transparent and seamless to the application (e.g., location service) and user.

The LBS bridge provides a compact definition of the schema 134 (also referred to as a data link table) of the external database 128–130 (including the name of the attributes, the types and the constraints). Within the schema, data source information (e.g., how to connect and communicate to the external database 129–130) and the SQL (structured query language) select statement that will extract the relevant properties from the data source corresponding to the schema 134 description are provided. Additionally, the SQL statement contains information about the foreign key column name that identifies the key for uniquely identifying records in the external database 128–130.

Additional information used to provide location based services may be stored in the LBS database 132 in the form of a user profile property table (UPPT) (also referred to as a databridge table). The UPPT may be existing user profile information that is stored locally or may be created specifically for accessing the external data sources 128–130. Commonly, the UPPT maintains information about spatially-aware user profile items stored externally from the local data store 132. Each record in the foreign data source 128–130 is identified by storing the foreign key for the record in the LBS database 132 (in the UPPT). In addition, positional information for each external record is obtained/extracted and stored in the UPPT as a geocoding/spatial index (thus making the external database 128–130 LBS enabled). Further, if necessary, non-coordinate position information (e.g., textual street address, landmarks, etc.) may be geocoded to create the geocoding/spatial index and stored in the UPPT. Accordingly, a link/relationship is established between a local UPPT record and a record/item stored in external databases 128–130. The UPPT may contain records for every record in the external data source 128–130 or for a subset of records in the external data source 128–130.

The collection of these services are made available in the form of an external API 122 for system integtators. Such an external API 122 may also be referred to as a user profile manager. As a result of the generic LBS bridge, LBS applications 110 may extend to the large amount of profile information accumulated by wireless carriers 130, phone companies 128, etc. This extension makes LBS services more personalized and valuable to the end user.

Figure 5:
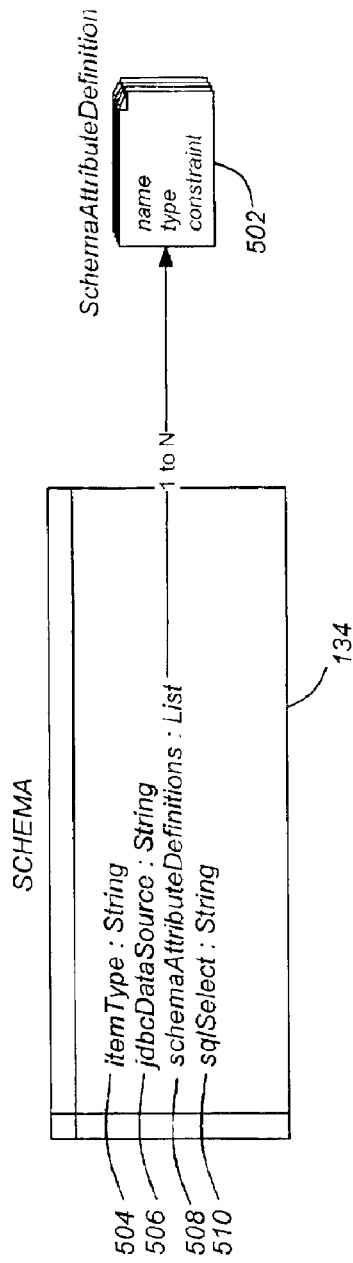
FIG. 5 illustrates the structure of a schema for an external database in accordance with one or more embodiments of the invention.

FIG. 5 illustrates the structure of a schema 134 for an external database 128–130 in accordance with one or more embodiments of the inventions. As described above, the schema definition 134 maintains information about external data sources 128–130. Each schema 134 definition stored by the LBS application 110 provides a description for each object in the external database 128–130. In other words, there is a corresponding schema 134 for each object in the external database 128–130. For example, an address object in the external database 128–130 will have a corresponding schema definition 134. Further, for each field/attribute in the object, a corresponding attribute definition 502 is stored with the schema 134. For example, the address object has multiple fields/attributes such as name, number, street name, city, state, and zip. For each field/attribute, a schema attribute definition 502 is stored with the schema 134.

The type of database 504 (i.e., itemType: String; e.g., Address) in the schema 134 provides the type or a name for the object in the external database 128–130. Data source information 506 (i.e., jdbcDataSource: String) provides information regarding how to connect and communicate with the external database 128–130. Such information may fully define where the data is, including its database 128–130, its row, and its column. For example, information regarding which carrier 126 is hosting a particular database 128–130 and how to communicate with the database 128–130 is stored.

As described above, a list 508 of attributes is set forth in the schema 134. For each attribute, an attribute definition 502 provides the name of the attribute, the type of attribute and a constraint of the attribute. Thus, for each schema 134, a single list 508 maps to multiple attribute definitions 502.

An SQL select statement 510 (e.g., a "WHERE" clause) provides the command for extracting relevant properties (e.g., a row or record) from the data source 128–130. Accordingly, schema 134 contains all of the definitional information for objects in the external databases 128–130.

As described above, an API 122 (also referred to as the user profile manager 600) may be utilized for maintaining schema 134 information, schema attribute definition 502 information, and for accessing/retrieving detailed information (i.e., user profile information) from external databases 128–130. Additionally, the API may be utilized to maintain the UPPT such as adding or deleting a particular entry from the UPPT. Further, even when maintaining the UPPT, whether the data is coming from a local data source or an external data source 128–130 remains transparent to the user.

Figure 6:
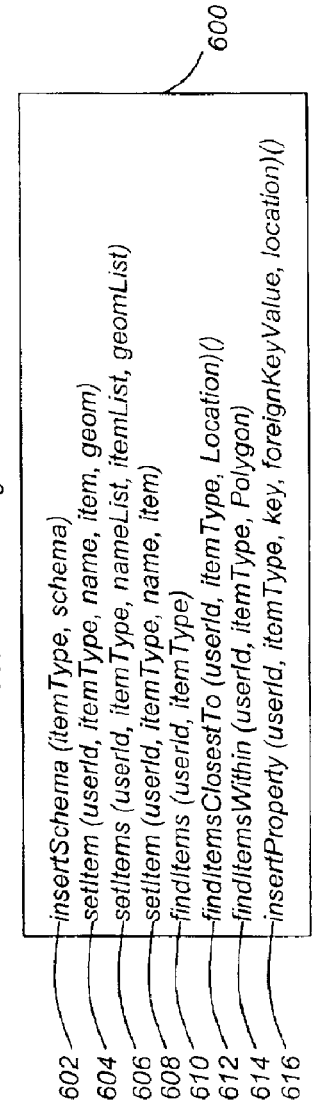
FIG. 6 illustrates a user profile manager in accordance with one or more embodiments of the invention.

FIG. 6 illustrates a user profile manager in accordance with one or more embodiments of the invention. To add a schema definition 134 to the system 100 so that the external database 128–130 may be accessed, the insertSchema method 602 of the user profile manager 600 may be utilized. An application provider or the carrier 126 may utilize the insertSchema method 602 for this purpose. A schema definition and type information for the schema are supplied to the user profile manager 600 to add the schema. Once a schema definition 134 has been added to the system 100, the name of the schema 134 and the schema information is added to a list of schemas 134 referred to as a foreign item type schema definition.

Table 1 illustrates a foreign item type schema definition that contains information regarding the schemas 134 that have been added to the system 100 (i.e., using the insertSchema method 602) in accordance with one or mote embodiments of the invention.

TABLE 1

| Item Type | Schema Blob (OR addn'l columns) |
| --- | --- |
| ADDRESS | ADDRESS SCHEMA |
| CUSTOMER | CUSTOMER SCHEMA |
| TYPE_XX | TYPE_XX SCHEMA |

As illustrated in Table 1, an address object, customer object, and type_xx object all have schema definitions 134 maintained by LBS application 110. To add an entry to the foreign item type schema definition, the insertSchema method 602 may be used while specifying an itemType 504.

As described above the UPPT maintains information about spatially aware user profile items stored externally from the local database 132. The individual items that are maintained in the UPPT may be populated and maintained using methods 604–608. For example, to set a data link for an item/record to the UPPT table, one of the methods 604–608 may be utilized using one or mote of the following parameters: a userId, type information, a name for the item, the item property value, and an optional geocoded location.

Since a location based service is being provided by the system 100, the methods 610–614 utilize positional information. However, objects/records within external databases 128–130 may not be LBS enabled. For example, location information (i.e., a spatial/geocoded index) may not be associated with the objects. Nonetheless, most objects stored within external databases 128–130 may have a location-like property. For example, an external database 128–130 may contain a home address of a cellular subscriber but not a spatial index that identifies the location in space of the home address.

To allow the methods 610–614 to utilize positional information, the positional information for each record in database 128–130 may be stored in the UPPT within the LBS database 132 using the user profile manager 600 and methods 604–608. Thus, each record in the UPPT is uniquely identified by a key and contains positional information (in the form of a spatial index such as a geocoded location) for that record.

When deploying a system 100 of the invention, the spatial index may be obtained for each record of each object in the external database 128–130. This spatial index information along with a key for identifying each record are then stored in the UPPT. Alternatively, individual items/features/records within UPPT may be added or deleted with appropriate positional information as desired. Unlike the mobile device 104, the information stored in the external data source 128–130 and associated positional information changes infrequently. Accordingly, updates to the information within the UPPT do not need to occur frequently and may be scheduled in longer intervals.

Once the schema definition is initialized within system 100 and the UPPT is populated, the user profile manager 600 may be utilized to retrieve the relevant information from the external database 128–130. Methods 610–614 may be utilized to find and retrieve this information.

Table 2 illustrates a user profile property table created by the user profile manager 600 in accordance with one or more embodiments of the invention.

TABLE 2

| User ID | Type | Foreign Key Value | Geometry |
|---|---|---|---|
| John | ADDRESS | Raju | aGeocodedLocation |
| John | ADDRESS | Scott | aGeocodedLocation |
| John | ADDRESS | Tim | aGeocodedLocation |

Each row/entry of Table 2 represents a record of an address object within external database 128–130. While methods 604–608 may be utilized to set location properties and attributes for partial records in the UPPT, the insertProperty method 616 is utilized to add a new entry (e.g., an address entry) to the UPPT. With the insertProperty method 616, a user ID identifies who is entering the information and the type field indicates the type of information being entered (i.e. as set forth in the foreign item type schema definition of Table 1). The Foreign Key Value column contains the foreign key for the actual address data for that user in the external database. However, in the invention, the item values in the user profile property table are set to null, since the data is stored in the external databases 128–130. Thus, the actual address data is not stored in the UPPT.

The key identifies the unique identifier for that entry. Such a key may be set using a hash algorithm, may be set by the user, may be a combination of columns/properties, or may be set using any other methodology that can uniquely identify a record of an object in database 128–130. For example, in Table 2, the key uniquely identifies the entry by a user's name (e.g., Raju, Scott, or Tim).

The geometry field of Table 2 contains optional positional information from the external database 128–130 stored as a geocoding index. The use of such positional information makes the external database 128–130 LBS enabled thereby allowing spatial queries to be performed on the data. As described above, when the system 100 is deployed, this positional information is obtained and may be extracted from the records in database 128–130. Thereafter, the positional information is stored in the UPPT. Accordingly, the positional information comprises a location of the information stored in the external database 128–130. For example, the geocoded location may identify the location of the home address of one or more customers.

Once obtained, the location in the UPPT may then be used by an LBS service to provide highly customized services. For example, using the geocoded location of the home address of a particular customer, when the customer is traveling towards home, restaurants near the customer's home may be determined. Further, phone numbers and hours for such restaurants, or maps based on the actual home address to the restaurant may be supplied to the customer.

Using the methods 610–614 and the UPPT, appropriate additional and desired information (referred to as items or features) may be obtained from the external databases 128–130. The methods 610–614 may be used to find multiple items/features (e.g., using findItems 610), items/features closest to a specific location (e.g., using findItemsClosestTo 612 and specifying a Location), or items/features within a certain defined area (e.g., using findItemsWithin 614 and specifying a Polygon that identifies an area).

For example, to find items/features closest to the current user, the LBS application may utilize the findItemsClosestTo method 612 and supply a mobile device's 104 location. The method 612 then reviews the UPPT geometry column to locate the closest location. Once the appropriate entries are identified, the key in the entry identifies the appropriate entry in the external database 128–130. The method may then access the schema 134 to determine how to communicate with the external database 128–130 (e.g., using jdbcDataSource method 506) and the appropriate SQL select statement to use to retrieve the information (i.e., using sqlSelect 510). The key from the =UPPT is used with the SQL select statement to retrieve the additional profile information from external database 128–130.

Similarly, the findItemsWithin method 614 allows the user to specify a polygon within which to find entries. The method 614 examines the UPPT geometry properties to locate locations within the specified polygon. Once the appropriate entries are identified, the additional information may be retrieved from the external database 128–130 using the sqlSelect statement 510 with the appropriate keys.

Accordingly, multiple schema definitions 134 set forth the definition of each external database 128–130. To access the user profile information, the schema is added to a list of schemas (i.e., the foreign item type schema definition). When initialized, portions of a user's profile information are extracted and stored in a user profile property table. Through an API, queries may be performed to retrieve data (e.g., using standard querying mechanisms). If the data is locally available, then it is merely retrieved. However, extended properties that are not locally available are fetched internally by issuing a query (e.g., a JDBC™ [Java DataBase Connectivity] call) using the data from the schema 134 and UPPT. A JDBC™ call is an API call that allows a user to access virtually any tabular data source from the Java™ programming language. For example, the user profile property manager may be utilized to access the UPPT and retrieve additional user profile information from the external databases 128–130.

By using the user profile property table, the actual information (i.e., the item information) remains in the external databases 128–130. The SQL statement 510 may then be used to retrieve information from the specified datasource 506 when desired.

Further, by storing location information in the UPPT, location based services may be offered without retrieving all of the user profile information from the external databases 128–130. For example, if the location information identifies the location of the user, the location information may be utilized in the findItemsClosestTo method 612 to retrieve particular locations (e.g., landmarks, etc.) nearby. Additionally, since the location of the user is known (e.g., using the locator adapter based system as described above), the known device location can be used in combination with the retrieval of additional profile information to offer customized services to the user.

Accordingly, the LBS bridge enables the extension of location based services to the large amount of profile information accumulated by wireless carriers, phone companies, etc. which in turn makes their services more personalized and valuable to the end user.

Example of LBS Bridge

An example of the use of an LBS bridge occurs when a user has an address book/contact list and other information stored in a relational database 128–130 separately from his LBS enabled data and/or locally stored user profile information. The user may desire to view, search, and locate all of his contacts in the contact list.

To provide these capabilities, a link is setup between a locally stored item and an external data source 128–130 item. Such a link may be established using the user profile manager 600. Spatial entries (i.e., location information) for the address book items may need to be explicitly added to enable spatial queries. After establishing the link, the item is a row in the user profile property table. To access the row, a user id (login ID), item type (e.g., "addressList1") and item ID (e.g., friend1) may be used.

The external data source item remains in a row in the external data source. To access the row in the external data source, a foreign data source name (e.g., that identifies the JDBC™ data source), and an SQL select statement (e.g., that extracts the row from the data source), all of which are stored in the schema definition 134, are needed.

Using a 122 API, relational and spatial querying of all resources may be performed Since an API is utilized, it is transparent to the user whether the data is coming from a local data source (e.g., from within LBS database 132) or whether the data is coming from external data sources 128–130.

Using this system, users may be responsible for managing the schemas (and datalinks), populating the user profile property table (including spatial information for each record) and updating spatial information when necessary.

LBS Bridge Flow

Figure 7:
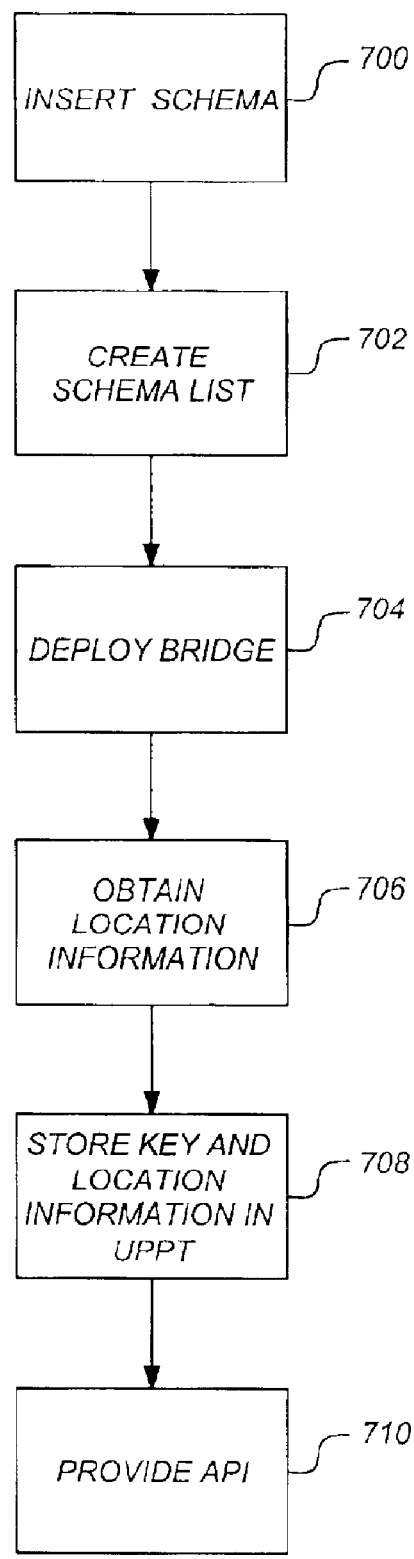
FIG. 7 is a flow chart illustrating the use of the LBS bridge to external data sources in accordance with one or more embodiments of the invention.

FIG. 7 is a flow chart illustrating the use of the LBS bridge to external data sources in accordance with one or more embodiments of the invention. At step 700, a schema definition 134 is inserted into the system 100. The schema definition 134 may be inserted by a carrier 126 or any other party that desires to use an external database 128–130 in the system 100. As described above, the schema definition comprises one or more schema attributes, an SQL select statement that extracts properties from the external database 128–130 when executed, and data source information that describes how to connect and communicate with the external database. The insertion of the schema definition may also include the creation of a schema 134 list (also referred to as a foreign item type schema definition) at step 702. Such a schema 134 list likely comprises a table with schema 134 information/definition and a name or reference for the schema 134.

At step 704, the LBS bridge of the system is deployed/initialized. The deployment of the system comprises obtaining location information for each record of data in external database 128–130 (that is represented by a schema definition 134) at step 706. The obtained location information and a key for each record is then stored locally in a UPPT within an LBS database 132 at step 708. At step 710, an API for utilizing the bridge to access information in external database 128–130 is provided.

To access the information, a method of the API is used. The method evaluates the UPPT to determine appropriate records to retrieve (based on the location information stored within the UPPT). The key for the appropriate record(s) is then used to retrieve more detailed profile information from external database 128–130. The method knows how to communicate and retrieve such information from the schema definition 134 that contains the data source information and SQL select statement.

Conclusion

This concludes the description of the preferred embodiment of the invention. The following describes some alternative embodiments for accomplishing the present invention. For example, any type of computer or mobile device, such as a cellular phone, personal digital assistant, mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for location enabling of user's profile information in an external database comprising:

storing, in a local memory, a compact definition of schema of an external database, wherein the external database comprises a user's profile information;

storing, in the local memory, data source information that describes how to connect and communicate with the external database;

storing, in the local memory, a structured query language (SQL) statement that, upon execution, extracts properties from the external database corresponding to the compact definition;

storing, in the local memory, a foreign key that identifies a record in the external database;

storing, in the local memory, positional information, for the record in the external database, as a geocoding index; and providing access to the user's profile information using the stored compact definition, data source information, SQL statement, foreign key, and positional information.

2. The method of claim 1 wherein the compact definition of the schema comprises a name of one or more attributes, a type for each attribute, and a constraint for each attribute.

3. The method of claim 1 wherein the foreign key is stored in a location based services database.

4. The method of claim 1 further comprising extracting the positional information from the external database.

5. The method of claim 1 wherein the positional information is stored in a location based services database.

6. The method of claim 1 wherein the positional information is used to determine a record in the external database for which additional information is to be retrieved.

7. The method of claim 1 further comprising comparing the positional information to a location of a user's mobile device to provide customized services to the user.

8. The method of claim 1 wherein the foreign key and positional information are stored in a row of a table.

9. The method of claim 1 wherein the access is provided in an application programming interface (API).

10. The method of claim 1 wherein the access is provided by utilizing the foreign key in the SQL statement in accordance with the data source information.

11. The method of claim 1 wherein the user's profile information comprises personal information of the user.

12. The method of claim 1 wherein the user's profile information comprises preferences of the user.

13. The method of claim 1 wherein the foreign key sad positional information are obtained when deploying a bridge that provides access to the profile information.

14. The method of claim 1 wherein whether a location of the user profile information is stored internally or externally is transparent to an application utilizing the user profile information.

15. An apparatus for location enabling user profile information in an external database, comprising:

(a) a computer having a memory attached thereto, wherein the computer is configured to communicate with an external database that comprises a user's profile information;

(b) a location based services (LBS) database stored in the memory on the computer;

(c) an LBS application executing on the computer, wherein the LBS application is configured to:

(i) store a compact definition of a schema of the external database;

(ii) store data source information, that describes how to connect and communicate with the external database;

(iii) store an SQL statement that, upon execution, extracts properties from the external database corresponding to the compact definition;

(iv) store, in the LBS database, a foreign key that identifies a record in the external database;

(v) store, in the LBS database, positional information for the record in the external database as a geocoding index; and (vi) provide access to the user's profile information using the compact definition, data source information, SQL statement, foreign key, and positional information.

16. The apparatus of claim 15 wherein the compact definition of the schema comprises a name of one or more attributes, a type for each attribute, and a constraint for each attribute.

17. The apparatus of claim 15 wherein the LBS application is further configured to extract the positional information from to external database.

18. The apparatus of claim 15 wherein the positional information is used to determine a record in the external database for which additional information is to be retrieved.

19. The apparatus of claim 15 wherein the positional information is compared to a location of a user's mobile device to provide customized services to the user.

20. The apparatus of claim 15 wherein the foreign key and positional information are stored in a row of a table.

21. The apparatus of claim 15 wherein the access is provided in an application programming interface (API).

22. The apparatus of claim 15 wherein the access is provided by utilizing the foreign key in the SQL statement in accordance with the data source information.

23. The apparatus of claim 15 wherein the user's profile information comprises personal information of the user.

24. The apparatus of claim 15 wherein the user's profile information comprises preferences of the user.

25. The apparatus of claim 15 wherein the foreign key and positional information are obtained when deploying a bridge that provides access to the profile information.

26. The apparatus of claim 15 wherein whether a location of the user profile information is stored internally or externally is transparent to an application utilizing the user profile information.

27. An article of manufacture comprising a program storage medium readable by a computer and embodying one or more instructions executable by the computer to perform a method for location enabling user profile information in a computer system, the method comprising:

storing, in local memory, a compact definition of a schema of an external database, wherein the external database comprises a user's profile information;

storing, in local memory, data source information that describes how to connect and communicate with the external database;

storing, in local memory, a structured query language (SQL) statement that, upon execution, extracts properties from the external database corresponding to the compact definition;

storing, in local memory, a foreign key that identifies a record in the external database;

storing, in local memory, positional information for the record in the external database as a geocoding index; and providing access to the user's profile information using the stored compact definition, data source information, SQL statement, foreign key, and positional information.

28. The article of manufacture of claim 27 wherein the compact definition of the schema comprises a name of one or more attributes, a type for each attribute, and a constraint for each attribute.

29. The article of manufacture of claim 27 wherein the foreign key is stored in a location based services database.

30. The article of manufacture of claim 27 wherein the method further comprises extracting the positional information from the external database.

31. The article of manufacture of claim 27 wherein the positional information is scored in a location based services database.

32. The article of manufacture of claim 27 wherein the positional information is used to determine a record in the external database for which additional information is to be retrieved.

33. The apparatus of claim 15 wherein the method further comprises comparing the positional information to a location of a user's mobile device to provide customized services to the user.

34. The article of manufacture of claim 27 wherein the foreign key and positional information are stored in a row of a table.

35. The article of manufacture of claim 27 wherein the access is provided in an application programming interface (API).

36. The article of manufacture of claim 27 wherein the access is provided by utilizing the foreign key in the SQL statement in accordance with the data source information.

37. The article of manufacture of claim 27 wherein the user's profile information comprises personal information of the user.

38. The article of manufacture of claim 27 wherein the user's profile information comprises preferences of the user.

39. The article of manufacture of claim 27 wherein the foreign key and positional information are obtained when deploying a bridge that provides access to the profile information.

40. The article of manufacture of claim 27 wherein whether a location of the user profile information is stored internally or externally is transparent to an application utilizing the user profile information.

* * * * *

UNITED STATES PATENT AND TRADEMARK OFFICE
CERTIFICATE OF CORRECTION

PATENT NO. : 6,988,103 B2  
APPLICATION NO. : 10/034440  
DATED : January 17, 2006  
INVENTOR(S) : Nemmara Chithambaram and Scott Ding Page 1 of 1

It is certified that error appears in the above-identified patent and that said Letters Patent is hereby corrected as shown below:

Column 14, line 59, "sad" should read --and--;

Column 15, line 11, after "information" delete ",";

Column 15, line 32, "to" should read --the--;

Column 16, line 30, "scored" should read --stored--.

Signed and Sealed this

Twenty-sixth Day of September, 2006

JON W. DUDAS  
*Director of the United States Patent and Trademark Office*